(12) United States Patent
Yoshikawa

(10) Patent No.: US 12,437,075 B2
(45) Date of Patent: Oct. 7, 2025

(54) CONTROL APPARATUS AND CONTROL METHOD

(71) Applicant: HONDA MOTOR CO., LTD., Tokyo (JP)

(72) Inventor: Hiroki Yoshikawa, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 273 days.

(21) Appl. No.: 18/451,903

(22) Filed: Aug. 18, 2023

(65) Prior Publication Data

US 2024/0104218 A1 Mar. 28, 2024

(30) Foreign Application Priority Data

Sep. 28, 2022 (JP) ................. 2022-154740

(51) Int. Cl.
*G06F 21/57* (2013.01)
*G06F 8/65* (2018.01)

(52) U.S. Cl.
CPC .............. *G06F 21/572* (2013.01); *G06F 8/65* (2013.01); *G06F 2221/033* (2013.01)

(58) Field of Classification Search
CPC ............ B60R 25/31; B60R 2025/1013; B60R 25/102; B60R 25/305; B60R 25/1004; B60R 25/104; B60R 2025/1016; B60R 21/0136; B60R 21/34; B60R 2300/8073; B60R 2325/20; B60R 25/00; B60R 25/1001; B60R 25/1003; B60R 25/30; B60R 25/302; B60R 25/307; G08B 13/00; G08B 21/22; G08B 25/00; G08B 25/008; H04L 67/12; H04L 12/2825; H04L 2209/84; H04L 51/224; H04N 21/41422; H04N 7/181; H04N 7/183; H04W 12/06; H04W 12/082; H04W 4/44; H04W 4/21

See application file for complete search history.

(56) References Cited

U.S. PATENT DOCUMENTS 8,555,096 B2 * 10/2013 Chall .................... H01L 23/041
                                                             713/323
9,525,700 B1 * 12/2016 Malinowski ............ G06N 7/01
(Continued)

FOREIGN PATENT DOCUMENTS

JP    2012-106593 A    6/2012
JP    2012-113394 A    6/2012
(Continued)

OTHER PUBLICATIONS

Japanese Office Action dated Jul. 23, 2024 issued in corresponding Japanese application No. 2022-154740 A; English machine translation included (7 pages).

*Primary Examiner* — Greg C Bengzon
(74) *Attorney, Agent, or Firm* — Rankin, Hill & Clark LLP

(57) ABSTRACT

A control apparatus includes: an alarm unit that executes a monitoring function of detecting a wrongful act on a vehicle and causes an alarm output unit to output an alarm when the wrongful act is detected by the monitoring function; a software update unit that performs an update of software of an electronic device equipped in the vehicle; and an alarm output control unit that performs restriction of the output of the alarm when the software update unit performs the update of the software of the electronic device.

11 Claims, 6 Drawing Sheets

(56) References Cited

U.S. PATENT DOCUMENTS

| | | | | |
|---|---|---|---|---|
| 10,482,226 | B1* | 11/2019 | Konrardy | G08G 1/161 |
| 10,501,055 | B1* | 12/2019 | Yi | G06Q 50/40 |
| 10,507,793 | B1* | 12/2019 | De Moura Partika | B60Q 5/005 |
| 10,525,934 | B1* | 1/2020 | Gilbert-Eyres | B60R 25/102 |
| 10,682,983 | B2* | 6/2020 | Santavicca | B60R 25/30 |
| 10,871,952 | B2* | 12/2020 | Wang | H04L 63/061 |
| 10,899,317 | B1* | 1/2021 | Moeller | B60R 25/30 |
| 2008/0027602 | A1* | 1/2008 | Yeap | B60R 25/04 701/31.4 |
| 2013/0246135 | A1* | 9/2013 | Wang | G06F 17/00 701/2 |
| 2014/0306799 | A1* | 10/2014 | Ricci | G06V 40/166 340/5.83 |
| 2014/0310702 | A1* | 10/2014 | Ricci | G06F 3/0673 717/173 |
| 2015/0277942 | A1* | 10/2015 | Rork | G06F 9/44505 701/31.4 |
| 2016/0362084 | A1* | 12/2016 | Martin | G01C 21/362 |
| 2019/0061692 | A1* | 2/2019 | Bobay | B60R 25/33 |
| 2019/0217777 | A1* | 7/2019 | John Naum Vangelov | G06F 11/07 |
| 2019/0294431 | A1 | 9/2019 | Saito | |
| 2020/0106678 | A1* | 4/2020 | Grill | H04L 41/0661 |
| 2020/0211301 | A1* | 7/2020 | Zhang | H04L 63/065 |
| 2020/0283004 | A1* | 9/2020 | Avetisian | B60R 16/0231 |
| 2020/0283007 | A1* | 9/2020 | Choi | B60W 50/029 |
| 2020/0369239 | A1* | 11/2020 | Mueller | B60R 25/30 |
| 2021/0349709 | A1* | 11/2021 | Nakatsukasa | G06F 8/656 |
| 2021/0362681 | A1* | 11/2021 | Moeller | G08B 29/188 |
| 2022/0012039 | A1* | 1/2022 | Fukuyo | H04L 67/34 |
| 2022/0017044 | A1* | 1/2022 | Bielby | G06V 10/82 |
| 2022/0053054 | A1* | 2/2022 | Patne | H04L 67/125 |
| 2022/0075057 | A1* | 3/2022 | Jones, II | G01S 17/86 |
| 2022/0242424 | A1* | 8/2022 | Saenz | B60W 50/12 |
| 2022/0283796 | A1* | 9/2022 | McFarland, Jr. | H04W 4/44 |
| 2023/0053103 | A1* | 2/2023 | Roberts | B60R 25/102 |
| 2023/0095760 | A1 | 3/2023 | Go et al. | |

FOREIGN PATENT DOCUMENTS

| | | |
|---|---|---|
| JP | 2014-056561 A | 3/2014 |
| JP | 2018-74798 A | 5/2018 |
| JP | 2021-157466 A | 10/2021 |
| WO | 2022/044270 A1 | 3/2022 |

* cited by examiner

CONTROL APPARATUS AND CONTROL METHOD

INCORPORATION BY REFERENCE

The present application claims priority under 35 U.S.C. § 119 to Japanese Patent Application No. 2022-154740 filed on Sep. 28, 2022. The content of the application is incorporated herein by reference in its entirety.

BACKGROUND OF THE INVENTION

Field of the Invention

The present invention relates to a control apparatus and a control method.

Description of the Related Art

In recent years, functions of software of devices equipped in a vehicle have been evolved for the purpose of improving traffic safety and improving comfortability of the vehicle. Accordingly, a proposal has also been made to update software of devices of an in-use vehicle for the purpose of improving and upgrading functions of the devices. For example, a method of downloading a program from a server to an on-vehicle device and installing the program is disclosed in Japanese Patent Laid-Open No. 2012-113394.

In the related art, a proposal has been made to advance a security function for preventing damage such as vehicle theft using software. For example, a configuration is disclosed in Japanese Patent Laid-Open No. 2014-056561 in which an ECU executes a program to detect occurrence of an abnormality such as an intrusion into a vehicle.

At the time of updating software of on-vehicle devices or ECUs, there may be a case of temporarily stopping or restarting functions of the on-vehicle devices or the ECUs being targets for the updating of the software. For this reason, there is a possibility that the on-vehicle devices or the ECUs stop or restart at the time of updating the software of the on-vehicle devices or the ECUs involved in the security function, resulting in erroneously detecting occurrence of an abnormality. Therefore, it has been difficult to update the software of the on-vehicle devices or the ECUs involved in the security function.

The present invention has been made in view of such a circumstance, and an object thereof is to realize a method of updating the software of the devices involved in the security function of the vehicle, thereby increasing opportunities for improving functions of vehicles and contributing to the advancement of sustainable transport systems.

SUMMARY OF THE INVENTION

An aspect of the present invention provides a control apparatus including: an alarm unit that executes a monitoring function of detecting a wrongful act on a vehicle and causes an alarm output unit to output an alarm when the wrongful act is detected by the monitoring function; a software update unit that performs an update of software of an electronic device equipped in the vehicle; and an alarm output control unit that performs restriction of the output of the alarm when the software update unit performs the update of the software of the electronic device.

In another aspect of the invention, the software update unit updates the software of the electronic device after the restriction is started by the alarm output control unit.

In another aspect of the invention, the alarm output control unit releases the restriction of the output of the alarm after the update of the software of the electronic device by the software update unit is completed.

In another aspect of the invention, the alarm output control unit restricts a start of the monitoring function until the update of the software of the electronic device is completed when the update of the software of the electronic device by the software update unit is scheduled in a state in which the monitoring function of the alarm unit is not executed.

In another aspect of the invention, the control apparatus further includes an image capturing unit that captures an image outside of the vehicle, and the alarm output control unit detects a person using the image captured by the image capturing unit when performing the restriction of the output of the alarm, and performs the restriction of the output of the alarm caused by the alarm unit when there is no person around the vehicle.

In another aspect of the invention, the alarm output control unit determines whether the person detected using the image captured by the image capturing unit is approaching the vehicle, and when the person is approaching the vehicle, causes the software update unit to stop the update of the software of the electronic device.

In another aspect of the invention, the alarm output control unit determines whether the person detected using the image captured by the image capturing unit is an authorized user of the vehicle, and performs the restriction of the output of the alarm caused by the alarm unit when the person is the authorized user of the vehicle.

In another aspect of the invention, when the wrongful act on the vehicle is detected after the update of the software of the electronic device by the software update unit is started, the alarm output control unit causes the software update unit to stop the update of the software of the electronic device and releases the restriction of the output of the alarm.

In another aspect of the invention, the electronic device includes a first electronic device and a second electronic device, and when the software update unit performs an update of software of the first electronic device, the alarm output control unit performs the restriction of the output of the alarm when the wrongful act is detected with respect to the first electronic device by the monitoring function, and does not perform the restriction of the output of the alarm when the wrongful act is detected with respect to the second electronic device by the monitoring function.

In another aspect of the invention, the alarm output unit includes a communication apparatus connected to a designated external apparatus via a communication line, and the alarm unit causes the communication apparatus to transmit information indicating the alarm to the external apparatus when the wrongful act is detected by the monitoring function.

Another aspect of the present invention provides a control method including: executing a monitoring function of detecting a wrongful act on a vehicle; causing an alarm output unit to output an alarm when the wrongful act is detected by the monitoring function; and performing restriction of the output of the alarm when a software update unit updates software of an electronic device equipped in the vehicle.

According to the aspects of the present invention, it is possible to update the software of the electronic device equipped in the vehicle without erroneously operating the function regarding the security. Thus, it is possible to increase opportunities for improving the function of the vehicle through the update of the software, thereby contributing to the advancement of sustainable transport systems.

DETAILED DESCRIPTION OF THE PREFERRED EMBODIMENT

Figure 1:
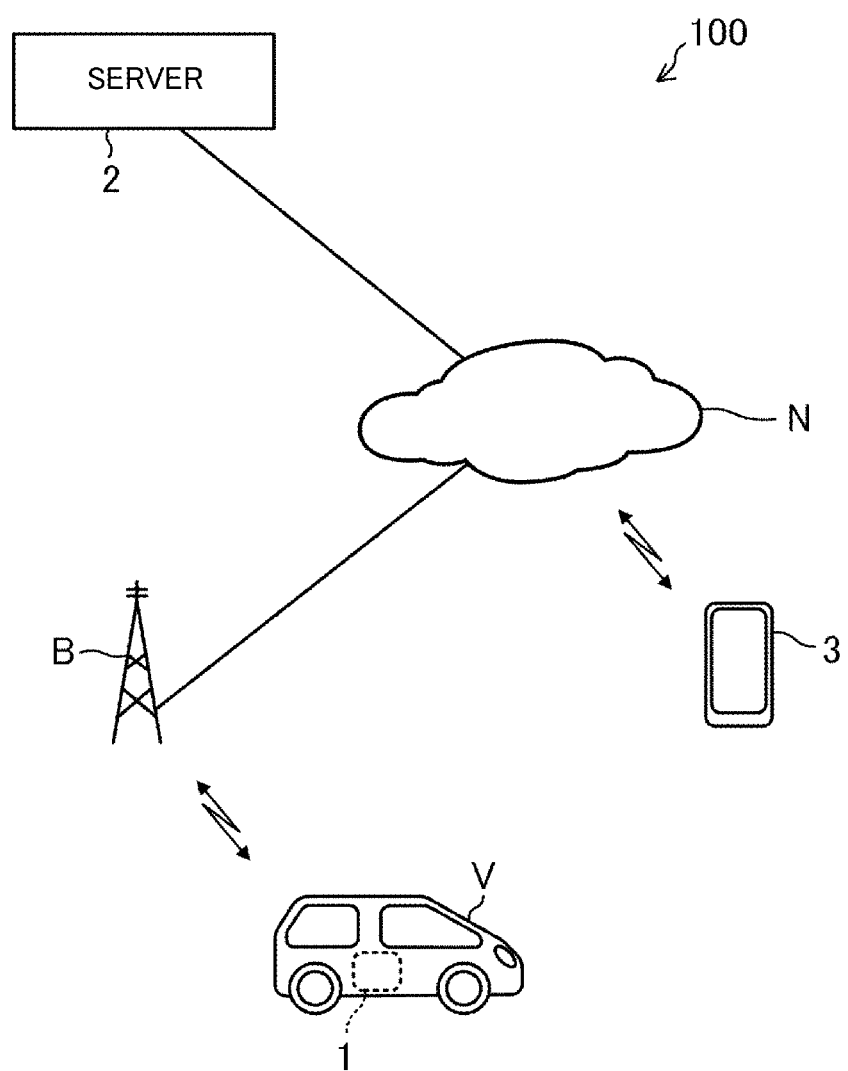
FIG. 1 is a diagram showing a schematic configuration of a management system.

FIG. 1 is a diagram showing a schematic configuration of a management system 100.

The management system 100 includes a control system 1 that performs general control and information processing of a vehicle V and enables updating of programs executed by various ECUs (Electronic Control Units) constituting the control system 1. The management system 100 includes a control system 1, a server 2, and a mobile terminal 3.

The server 2 is connected to the control system 1 by a communication network N.

The communication network N is configured by wired or wireless communication lines. The communication network N includes, for example, a cellular communication network, a Wi-Fi (registered trademark) network, a Bluetooth (registered trademark), the Internet, a WAN (Wide Area Network), a LAN (Local Area Network), a public line, a provider apparatus, a dedicated line, and a base station. FIG. 1 shows a base station B included in the communication network N. The control system 1 executes data communication with an external apparatus through the communication network N by executing cellular communication with the base station B using a TCU 21, which will be described below.

The control system 1 is mounted on the vehicle V, and includes various electronic devices provided in the vehicle V. The electronic device is, for example, an ECU. The control system 1 executes various functions of the vehicle V by integrating and controlling a plurality of ECUs.

The control system 1 can download data from the server 2, use the downloaded data to install a program in the ECU provided in the control system 1, and update the program installed in the ECU. Data downloaded to update the program from the server 2 by the control system 1 is called update data.

The management system 100 may include a server different from the server 2, and in this case, the control system 1 may download update data from the server different from the server 2. The server 2 may be one server computer, may be configured by a plurality of server computers, or may be a cloud server.

The control system 1 includes a TCU 21, which will be described below, as a communication unit. The control system 1 downloads update data from the server 2 by executing communication with the server 2 through the TCU 21. A process in which the control system 1 downloads the update data and uses the update data to install or update a program is called OTA (Over The Air).

The control system 1 is connected to the mobile terminal 3 via the communication network N so as to be capable of data communication. The mobile terminal 3 is a mobile computer used by a user of the vehicle V. The mobile terminal 3 is, for example, a tablet computer, a notebook computer, or a smart phone. The control system 1 executes data communication with the mobile terminal 3 to transmit text messages, e-mails, voice data or the like to the mobile terminal 3. The mobile terminal 3 executes processing for receiving the text messages or the e-mails transmitted from the control system 1 and displaying the received text messages or e-mails on a display screen and processing for receiving the voice data transmitted from the control system 1 and outputting voice based on the voice data. The mobile terminal 3 corresponds to an example of an external apparatus.

The vehicle V may be either an electric vehicle equipped with a motor as a power source that operates by electric power, or a vehicle equipped with an internal combustion engine. The internal combustion engine may function as a power source that drives the vehicle V. Further, a configuration may be adopted in which the internal combustion engine equipped on the vehicle V drives a generator (not shown) to generate electric power for driving a motor.

In the following description, a state in which the vehicle V is running refers to a state in which the internal combustion engine of the vehicle V is operating or can be started immediately, or a state in which the motor of the vehicle V can be operated immediately. The state in which the vehicle V is running is known as a so-called ignition-on state or a Ready state. A state in which the vehicle V is stopped refers to a state in which the internal combustion engine or the motor of the vehicle V cannot be operated immediately. The stopped state of the vehicle V is, for example, a state in which a fuel supply system needs to be started in order to start the internal combustion engine of the vehicle V, or a state in which an inverter circuit (not shown) equipped on the vehicle V needs to be started in order to operate the motor of the vehicle V. The state in which the vehicle V is stopped is a so-called ignition-off state.

The vehicle V includes an operation unit (not shown) for starting or stopping the vehicle V. The operation unit includes, for example, an SSSW (Start Stop SWitch) to be operated by the user and a receiving unit that receives an instruction to start and/or stop the vehicle V by an operation of a remote controller. The user of the vehicle V is, for example, a driver of the vehicle V or an owner of the vehicle V, but may also include persons, who use the vehicle V, other than the driver. An operation to start the vehicle V is, for example, an ignition-on operation, and an operation to stop the vehicle V is an ignition-off operation.

The control system 1 is in an ON state while the vehicle V is running. In the ON state, electric power is supplied to most of the functional units constituting the control system 1 as will be described below, and these functional units operate.

The control system 1 is in an OFF state while the vehicle V is stopped. In OFF state of the control system 1, some of the functional units constituting the control system 1 are in a state where the supply of the electric power is stopped, and the others are in a state of operating while the supply of the electric power is maintained. The control system 1 of the present embodiment executes a security function while the vehicle V is stopped. The control system 1 outputs an alarm when an abnormality in the control system 1 is detected at the time of execution of the security function. The abnormality detected by the control system 1 is an event that may be theft or damage of the vehicle V. The abnormality detected by the security function of the control system 1 corresponds to wrongful acts on the vehicle. Specifically, the abnormality detected by the security function of the control system 1 may include an operation in which doors or the like of the vehicle V are opened by an inappropriate way, an operation in which the vehicle body of the vehicle V is subjected to unnatural vibration, or an operation in which the vehicle V is run by an inappropriate way. In the present embodiment, the control system 1 can execute the security function while the vehicle V is stopped.

Furthermore, the control system 1 can also be operated as an ON state in the stopped state of the vehicle V. The control system 1 of the present embodiment can execute a function of installing a program in the stopped state of the vehicle V.

Figure 2:
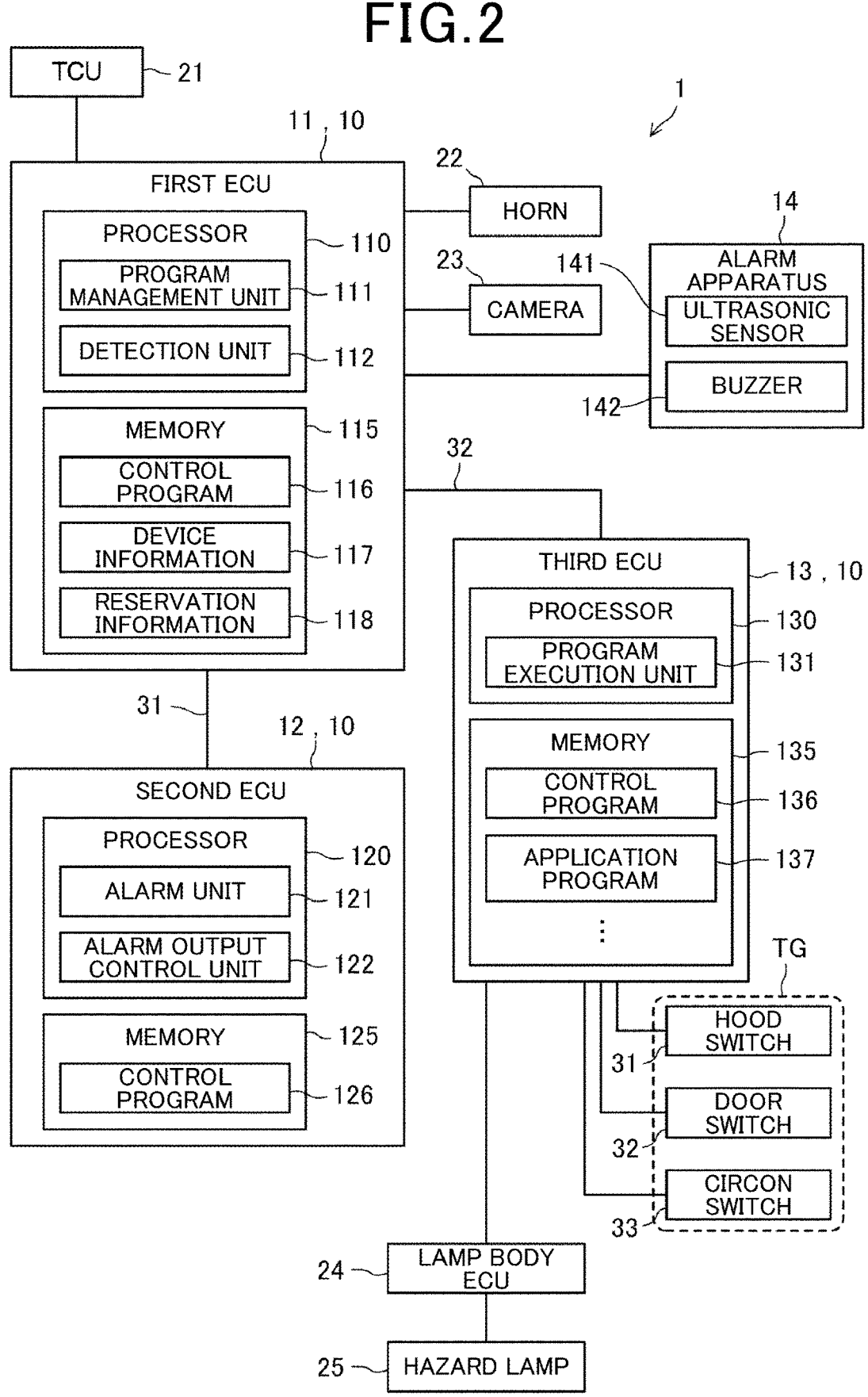
FIG. 2 is a block diagram showing main components of a control system of a vehicle.

FIG. 2 is a block diagram showing main components of the control system 1.

As shown in FIG. 2, the control system 1 includes a first ECU 11, a second ECU 12, and a third ECU 13, which are referred to as an ECU 10 unless otherwise distinguished. The first ECU 11 performs overall control and information processing of the vehicle V, and controls the ECU 10 constituting the control system 1. The first ECU 11 is connected to the second ECU 12 via a communication line 41, and is connected to the third ECU 13 via a communication line 42. The communication lines 41 and 42 and other communication lines of the control system 1 are configured by buses that perform communication in compliance with standards of CAN, Ethernet (registered trademark), and the like, or communication lines that perform P2P (Peer to Peer) communication. These communication lines may be configured by a single communication line, may be configured by a plurality of communication lines that perform communication in compliance with the same standard, or may be configured by a plurality of communication lines that perform communication in compliance with different standards.

The first ECU 11 implements a function of a gateway that manages exchange of communication data between the communication lines 41 and 42. In addition, the first ECU 11 executes OTA management. The OTA management includes processing for the control system 1 to download update data from the server 2, and control to install and update a program in the ECU 10 using the downloaded update program.

The first ECU 11 is connected with a TCU (Telematics Control Unit) 21, a horn 22, and a camera 23. The TCU 21 is a wireless communication apparatus in compliance with a communication standard of a mobile communication system. The horn 22 sounds according to an operation of a horn switch (not shown) and control of the first ECU 11. The camera 23 is a digital camera installed in the vehicle V so as to capture the outside of the vehicle V, and captures an image under the control of the first ECU 11. The first ECU 11 acquires captured image data from the camera 23. The camera 23 may be a monocular camera, a stereo camera, or a camera that captures an image with light having a wavelength outside a visible range. In addition, the camera 23 may include a plurality of cameras, or may include a camera that captures the cabin interior of the vehicle V. The camera 23 corresponds to an example of an image capturing unit.

The second ECU 12 executes a security function of the vehicle V. The third ECU 13 acquires values detected by various sensors equipped on the vehicle V to detect the state of the vehicle V. FIG. 2 shows a hood switch 31, a door switch 32, and a circon switch 33 as examples of sensors connected to the second ECU 12. The hood switch 31, the door switch 32, and the circon switch 33 are switch sensors that detect an open/closed state of an opening and closing mechanism of the vehicle V. The hood switch 31 detects an open/closed state of a bonnet hood of the vehicle V. The door switch 32 detects an open/closed state of a door of the vehicle V. The circon switch 33 detects a locked state of a door lock of the vehicle V. A plurality of door switches 32 and a plurality of circon switches 33 may be installed corresponding to doors and rear gates of the vehicle V, respectively.

A lamp body ECU 24 is connected to the second ECU 12. The lamp body ECU 24 is connected to a lighting apparatus provided in the vehicle V, and controls the lighting apparatus to turn on, blink, and turn off the light. FIG. 2 shows a hazard lamp 25 as an example of a lighting apparatus controlled by the lamp body ECU 24.

Respective components shown in FIG. 2 are some of the plurality of ECUs constituting the control system 1 and the devices controlled by these ECUs, and the control system 1 may include components not shown in FIG. 2. For example, the ECU 10 may include ECUs of ICB (Infotainment Control Box), MPU (Map Positioning Unit), MVC-ECU (MVC; Multi View Camera), PKS-ECU (PKS; Parking Support), and ADAS-ECU (ADAS; Advanced Driver-Assistance System), or ECUs that control the operation of various other devices and sensors provided in the vehicle V. Such devices and sensors may include a driving motor that drives the vehicle, a steering unit such as an accelerator or a brake, a VSA apparatus (VSA: Vehicle Stability Assist), a battery, window motors that drives door windows, actuators that drive door lock mechanisms, and a temperature sensor. Further, the ECU 10 may be connected to a V2X (Vehicle to Everything) communication apparatus, a GNSS (Global Navigation Satellite System) sensor, a touch panel, a display, and a speaker, for example. In addition, the functions of the first ECU 11, the second ECU 12, and the third ECU 13 in FIG. 2 are examples. These functions may be implemented in more ECUs, or may be implemented in one ECU. The connection form between the ECUs 10 and the connection form between the ECU 10 and each of the devices are also examples, and naturally, each of the devices can be connected to the ECU 10 different from that shown in FIG. 2.

In the control system 1, the first ECU 11 includes a processor 110 and a memory 115. The processor 110 is configured by, for example, a CPU (Central Processing Unit), an MCU (Micro Controller Unit), or an MPU (Micro Processor Unit). The memory 115 stores programs executed by the processor 110 and data processed by the processor 110 in a non-volatile manner. The memory 115 is configured by a ROM (Read Only Memory), for example. The memory 115 may include a RAM (Random Access Memory) that forms a work area for temporarily storing programs and data. The first ECU 11 may be configured by an integrated circuit that integrally includes the processor 110 and the memory 115. Further, the first ECU 11 may include, as independent hardware, the processor 110, the memory 115, and other circuits.

The memory 115 stores a control program 116, device information 117, and reservation information 118.

The processor 110 controls each component of the first ECU 11 and the apparatuses constituting the control system 1 by executing the control program 116. The processor 110 includes a program management unit 111 and a detection unit 112, as functional units related to application programs executed by the ECUs included in the control system 1.

The program management unit 111 manages installation and execution of the programs in the control system 1. The ECU 10 constituting the control system 1 has programs for controlling the devices equipped on the vehicle V, and controls the devices by executing the programs. Such programs are called firmware, middleware, or control programs. The programs managed by the program management unit 111 are one aspect of software. The program management unit 111 corresponds to an example of a software update unit.

The programs managed by the program management unit 111 may be any one of firmware, middleware, control programs, and application programs. In the present embodiment, a case will be described as an example where an object managed by the program management unit 111 is an application program. The application program is provided by a business operator of a manufacturer or a seller of the vehicle V, and is downloaded to the vehicle V through the communication network N from the server 2 managed by the business operator. When the control system 1 is connected to a diagnostic apparatus (not shown) installed in a dealership or a maintenance factory of the vehicle V, the program managed by the program management unit 111 may be downloaded to the vehicle V from the diagnostic apparatus. In addition, the application program may be a program developed or provided by a third party irrelevant to the manufacturer or the seller of the vehicle V.

The program management unit 111 specifies the ECU 10, which is a target for installation and update of the program. In the following description, the installation and the update of the program are collectively referred to as installation. The program management unit 111 communicates with the server 2 through the TCU 21 to request the server 2 for update data conforming to a model number, specifications, and a version of the ECU 10 to be installed. The program management unit 111 downloads the update data from the server 2, and installs the program based on the update data. After installing the program, the program management unit 111 checks the status of the installed program and completes the installation after confirming that the installation has been completed normally.

The detection unit 112 detects various ECUs 10 including in the control system 1 and each of the devices of the vehicle V controlled by the ECU 10. For example, the detection unit 112 detects the ECU 10 and each of the devices while the control system 1 is operating, and updates the device information 117.

The device information 117 includes information related to the ECU 10 constituting the control system 1 and the devices controlled by the ECU 10. The device information 117 includes, for example, information related to the model number and specifications of each of the ECUs 10 and the version of the program installed in the ECU 10.

The program management unit 111 accepts a reservation for installing a program in response to an operation or the like by the user. For example, the program management unit 111 inquires of the server 2 about the presence or absence of new update data corresponding to the ECU 10 included in the control system 1, and notifies the user to urge the installation using a display or touch panel (not shown) when there is new update data. When installation is instructed by an operation of the user, the program management unit 111 accepts the reservation based on the operation. When the reservation is accepted while the vehicle V is running, the program management unit 111 generates or updates the reservation information 118. The reservation information 118 is, for example, information designating that the program is to be installed after the vehicle V is stopped. The reservation information 118 includes information indicating the type of update data to be installed and the ECU 10 or the like to which the program is to be installed. When receiving the reservation, the program management unit 111 may download the update data while the vehicle V is running, or may download the update data after the vehicle V is stopped.

The program management unit 111 may install the program while the vehicle V is running. In this case, the control system 1 installs the program after stopping the vehicle V, and starts to run the vehicle V after the installation is completed. Further, there may be a case of not being necessary to stop the vehicle V to install the program. For example, a program for executing video playback of the vehicle V can be installed without stopping the vehicle V. In this case, the program management unit 111 installs the program while the vehicle V is kept running.

The second ECU 12 includes a processor 120 and a memory 125. The processor 120 is configured by, for example, a CPU, an MCU, or an MPU. The memory 125 stores programs executed by the processor 120 and data processed by the processor 120 in a non-volatile manner. The memory 125 is configured by a ROM, for example. The memory 125 may include a RAM that forms a work area for temporarily storing programs and data. The second ECU 12 may be configured by an integrated circuit that integrally includes the processor 120 and the memory 125. Further, the second ECU 12 may include, for example, as independent hardware, the processor 120, the memory 125, and other circuits.

The memory 125 stores a control program 126.

The processor 120 functions as an alarm unit 121 and an alarm output control unit 122 by executing the control program 126.

The alarm unit 121 executes a monitoring function of the vehicle V. The monitoring function of the alarm unit 121 corresponds to a security function of the vehicle V. The monitoring function is to detect an abnormality of the vehicle V while the vehicle V is stopped and to output an alarm. The alarm unit 121 starts executing the monitoring function when the vehicle V is stopped. When the monitoring function is released by the operation of the user, the control system 1 may have a configuration in which the alarm unit 121 does not execute the monitoring function.

The alarm unit 121 monitors a state of a monitoring target among the devices provided in the vehicle V. The monitoring target of the alarm unit 121 may be any of the ECU 10 included in the control system 1 and the devices connected to the ECU 10. In the present embodiment, a case will be described as an example where monitoring targets TGs of the alarm unit 121 are the hood switch 31, the door switch 32, and the circon switch 33. In this case, when the bonnet hood or door of the vehicle V is opened by an improper manner, or when the lock of the door of the vehicle V is released by an improper manner, the alarm unit 121 detects an abnormality of the vehicle V.

The alarm unit 121 determines the state of the vehicle V and performs a monitoring operation when determining that the vehicle is in a state in which the monitoring should be performed. The monitoring state is, for example, a state in which the vehicle V is stopped.

The alarm unit 121 detects a state of the monitoring target TG in the monitoring operation. The alarm unit 121 detects based on the state of the monitoring target TG that an abnormality has occurred in the vehicle V. The alarm unit 121 outputs an alarm when detecting that the abnormality of the vehicle V has occurred. An output aspect of the alarm is to sound the horn 22, for example. In this case, the alarm unit 121 outputs a signal requesting to sound the horn 22 to the first ECU 11. The output aspect of the alarm may be to blink the hazard lamp 25. In this case, the alarm unit 121 outputs a signal requesting to blink the hazard lamp 25 to the third ECU 13. The output aspect of the alarm may send a text message or an e-mail to the mobile terminal 3. In this case, the alarm unit 121 outputs a signal requesting to send the text message or the e-mail to the mobile terminal 3 through the TCU 21 to the first ECU 11.

The alarm output control unit 122 restricts the alarm output by the alarm unit 121. The alarm output control unit 122 restricts the output of the alarm when the program management unit 111 installs a program to the ECU 10 monitored by the alarm unit 121 or the ECU 10 that controls the device monitored by the alarm unit 121.

The restriction of the output of alarm by the alarm output control unit 122 is to prohibit or stop the output of alarm from the alarm unit 121, for example. To prohibit the output of alarm is to prohibit the start outputting the alarm, and to stop the output of alarm includes to stop the output of alarm while the alarm unit 121 is executing the monitoring function and/or to stop the monitoring function.

The restriction of the output of alarm by the alarm output control unit 122 may be to partially restrict the function of the alarm unit 121. Specifically, the restriction of the output of alarm by the alarm output control unit 122 may be to prohibit or stop the output using the horn 22 and the output through the TCU 21 from the alarm unit 121, and may be an aspect in which the output using the hazard lamp 25 from the alarm unit 121 is not restricted. In addition, the restriction of the output of alarm by the alarm output control unit 122 may be to prohibit or stop the monitoring operation of the alarm unit 121.

The third ECU 13 includes a processor 130 and a memory 135. The processor 130 is configured by, for example, a CPU, an MCU, or an MPU. The memory 135 stores programs executed by the processor 130 and data processed by the processor 130 in a non-volatile manner. The memory 135 is configured by a ROM, for example. The memory 135 may include a RAM that forms a work area for temporarily storing programs and data. The third ECU 13 may be configured by an integrated circuit that integrally includes the processor 130 and the memory 135. Further, the third ECU 13 may include, for example, as independent hardware, the processor 130, the memory 135, and other circuits.

The memory 135 stores a control program 136 and an application program 137. The processor 130 executes the control program 136 to constitute a platform for executing the application program 137. The platform corresponds to a program execution unit 131. In other words, the processor 130 can execute the application program 137 by executing the control program 136.

The third ECU 13 executes the application program 137 to control devices connected to the third ECU 13. For example, when the third ECU 13 is connected with a touch panel and a speaker which are not shown, the third ECU 13 executes the application program 137 to execute functions of playback of video contents, music playback, and hands-free calling, for example.

The control system 1 may include an alarm apparatus 14. The alarm apparatus 14 includes an ultrasonic sensor 141 and a buzzer 142. The ultrasonic sensor 141 is to detect movement of an object in the cabin of the vehicle V. The object of which movement is detected by the ultrasonic sensor 141 includes a person. When receiving an instruction to start alert from the ECU 10, the ultrasonic sensor 141 executes an alert operation in response to the instruction. When detecting the movement of the object in the alert operation, the ultrasonic sensor 141 sounds the buzzer 142. In the present embodiment, the alarm apparatus 14 starts the alert operation under the control of the first ECU 11. The alarm apparatus 14 can execute the alert operation independently of the alarm unit 121. For example, the alarm apparatus 14 can execute the alert operation while the alarm output control unit 122 restricts the output of alarm. The alert operation of the alarm apparatus 14 is a security function of the vehicle V, like the monitoring function of the alarm unit 121.

FIG. 3, FIG. 4, FIG. 5 and FIG. 6 are flowcharts showing operation examples of the control system 1, respectively. The operations shown in FIGS. 3 to 6 are operations when the control system 1 installs the program, and particularly show operation examples of installing the program while the vehicle V is stopped.

Figure 3:
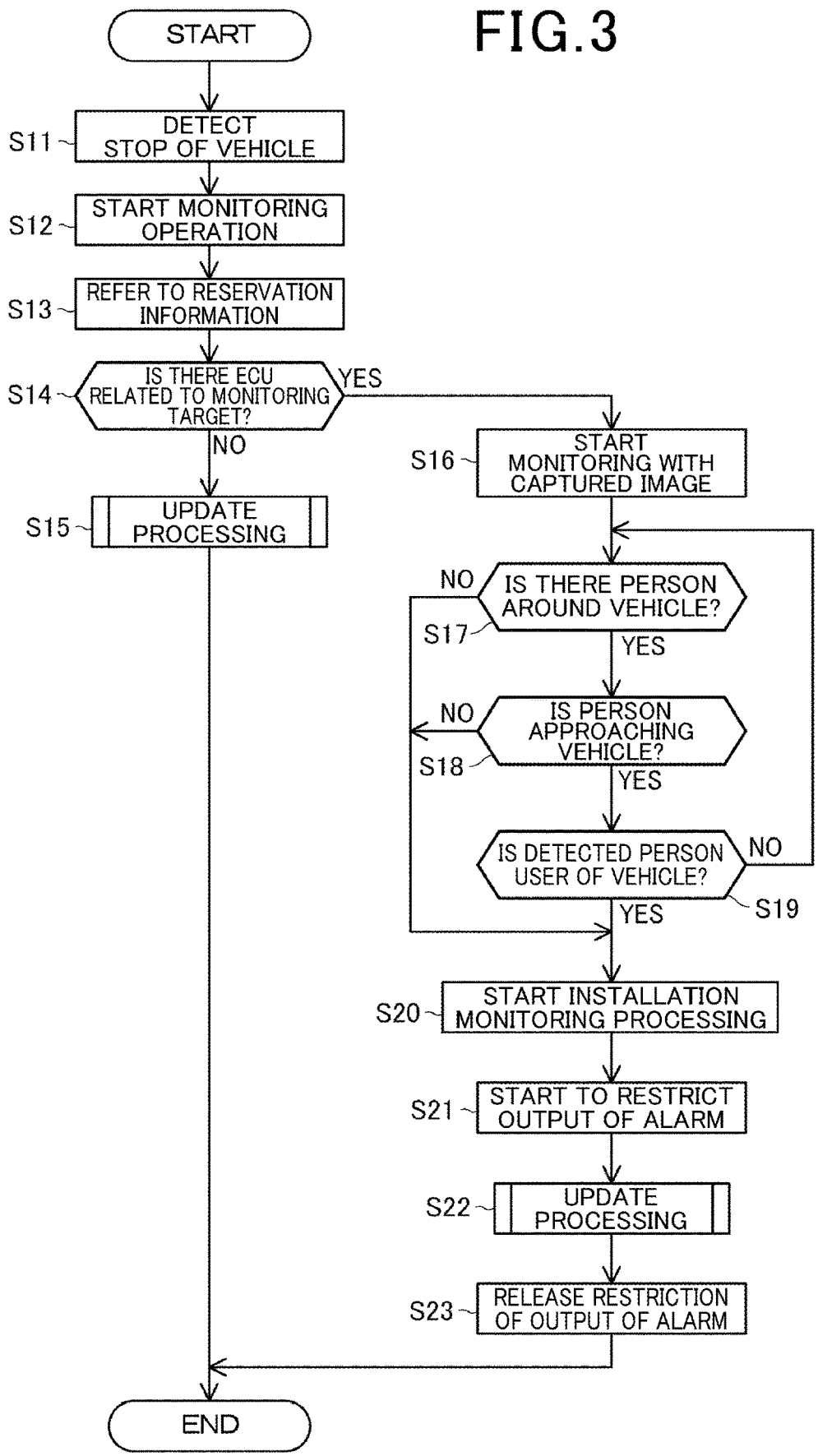
FIG. 3 is a flowchart showing an operation example of the control system.

The control system 1 is equipped with the monitoring function of the second ECU 12, detects an abnormality of the vehicle V during parking with the monitoring function, and outputs an alarm. FIGS. 3 to 6 show an operation example of installing the program when the alarm unit 121 is set to execute the monitoring function. Steps S11 to S15 and S22 in FIG. 3 are executed by the program management unit 111. Steps S16 to S21 and S23 are executed by the alarm output control unit 122.

The operation in FIG. 3 is performed when the installation of the program is reserved by the reservation information 118.

When the control system 1 detects that the vehicle V is stopped by the operation of the user (step S11), the monitoring operation of the alarm unit 121 is started (step S12). Subsequently, the control system 1 refers to the reservation information 118 (step S13). In step S13, the control system 1 specifies the ECU 10, which is a target for program installation, and the program to be installed, for example.

The control system 1 determines whether the ECU 10 being the target for program installation is the ECU 10 related to the monitoring target TG of the alarm unit 121 (step S14). In the configuration example shown in FIG. 2, the monitoring target TG is connected to the third ECU 13. In such a configuration, the third ECU 13 corresponds to the ECU 10 related to the monitoring target TG.

When the control system 1 determines that the ECU 10 being the target for program installation is not the ECU 10 related to the monitoring target TG of the alarm unit 121 (NO in step S14), update processing is executed (step S15), and this processing ends. In this case, the vehicle V is kept stopped, and the monitoring operation is executed by the alarm unit 121.

When determining that the ECU 10 being the target for program installation is the ECU 10 related to the monitoring target TG of the alarm unit 121 (YES in step S14), the control system 1 starts monitoring the image captured by the camera 23 (step S16). The control system 1 acquires the image captured by the camera 23, and determines whether there is a person around the vehicle V (step S17). Step S17 is a process of analyzing the image captured by the camera 23 and determining whether a person is shown in the captured image.

When the control system 1 determines that there is no person around the vehicle V (NO in step S17), the process proceeds to step S20, which will be described below.

When determining that there is a person around the vehicle V (YES in step S17), the control system 1 determines whether the person detected from the captured image is approaching the vehicle V (step S18). Step S18 is, for example, a process of comparing positions at which persons are detected in a plurality of images captured by the camera 23 at different timings and determining whether the person shown in the capture image is moving toward the vehicle V.

When the control system 1 determines that the person detected from the captured image is not approaching the vehicle V (NO in step S18), the process proceeds to step S20.

When determining that the person detected from the captured image is approaching the vehicle V (YES in step S18), the control system 1 determines whether the person detected from the captured image is the user of the vehicle V (step S19). Step S19 is, for example, a process of determining whether a face or the like of the person detected in the image captured by the camera 23 is similar to or matches the face or the like of the user registered in advance in the control system 1. For such a process, the user of the vehicle V is registered in advance in the control system 1. Specifically, information or the like indicating features of the images related to the face or the like of the user is stored in the first ECU 11.

When the control system 1 determines that the person detected from the captured image is not the user of the vehicle V (NO in step S19), the process returns to step S17.

When the control system 1 determines that the person detected from the captured image is the user of the vehicle V (YES in step S19), the process proceeds to step S20, and the control system 1 starts installation monitoring processing (step S20). The installation monitoring processing will be described below with reference to FIG. 5.

After starting the installation monitoring processing, the control system 1 starts to restrict the output of alarm from the alarm unit 121 (step S21).

The control system 1 executes update processing after executing the restriction by the alarm output control unit 122 (step S22).

After the update processing is completed, the control system 1 causes the alarm output control unit 122 to release the restriction of the output of alarm (step S23), and this operation ends.

Figure 4:
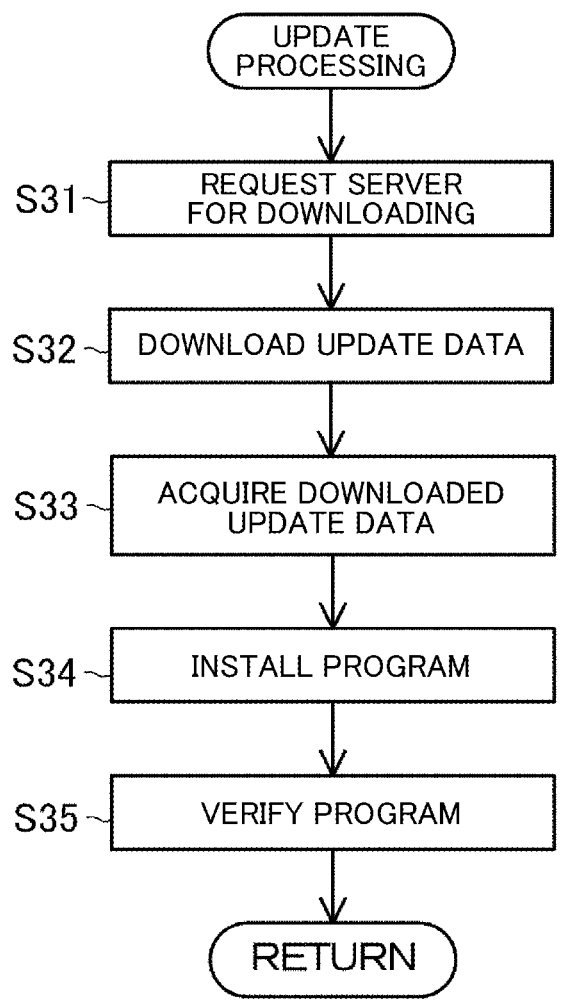
FIG. 4 is a flowchart showing an operation example of the control system.

FIG. 4 shows the update processing executed in steps S15 and S22 in FIG. 3. The operation shown in FIG. 4 is executed by the program management unit 111.

The control system 1 requests the server 2 for downloading of update data (step S31). The update data requested by the control system 1 is update data for installing the program of the ECU 10 designated by the reservation information 118, for example.

The control system 1 downloads the update data from the server 2 (step S32).

The control system 1 acquires the downloaded update data (step S33), and installs the program in the ECU 10 based on the acquired update data (step S34). Then, the control system 1 performs verification of the installed program in order to determine whether the program is normally installed (step S35). After the verification of the program is completed, the control system 1 ends the update processing, and the process returns to the operation in FIG. 3.

The control system 1 may perform steps S31 and S32 of the update processing shown in FIG. 4 before execution of the update processing, and download the update data from the server 2 in advance. For example, when generating or updating the reservation information 118 in response to acceptance of a reservation, the program management unit 111 may execute the operations of steps S31 and S32 based on the generated and updated reservation information 118. The operations of steps S31 and S32 may be executed while the vehicle V is running, that is, before the vehicle V is stopped. In this case, the control system 1 may execute steps S33 to S35 in steps S15 and S22 in FIG. 3.

In addition, the control system 1 may download, based on the reservation information 118, a plurality of pieces of update data from the server 2 before execution of the update processing. In this case, in step S33, the control system 1 selects and acquires the update data corresponding to the ECU 10 being the target for program installation, from the downloaded update data.

When an error is detected in the verification of the program, the control system 1 retries the installation of the program, or outputs the error to complete the installation, and the process returns to the operation in FIG. 3.

Figure 5:
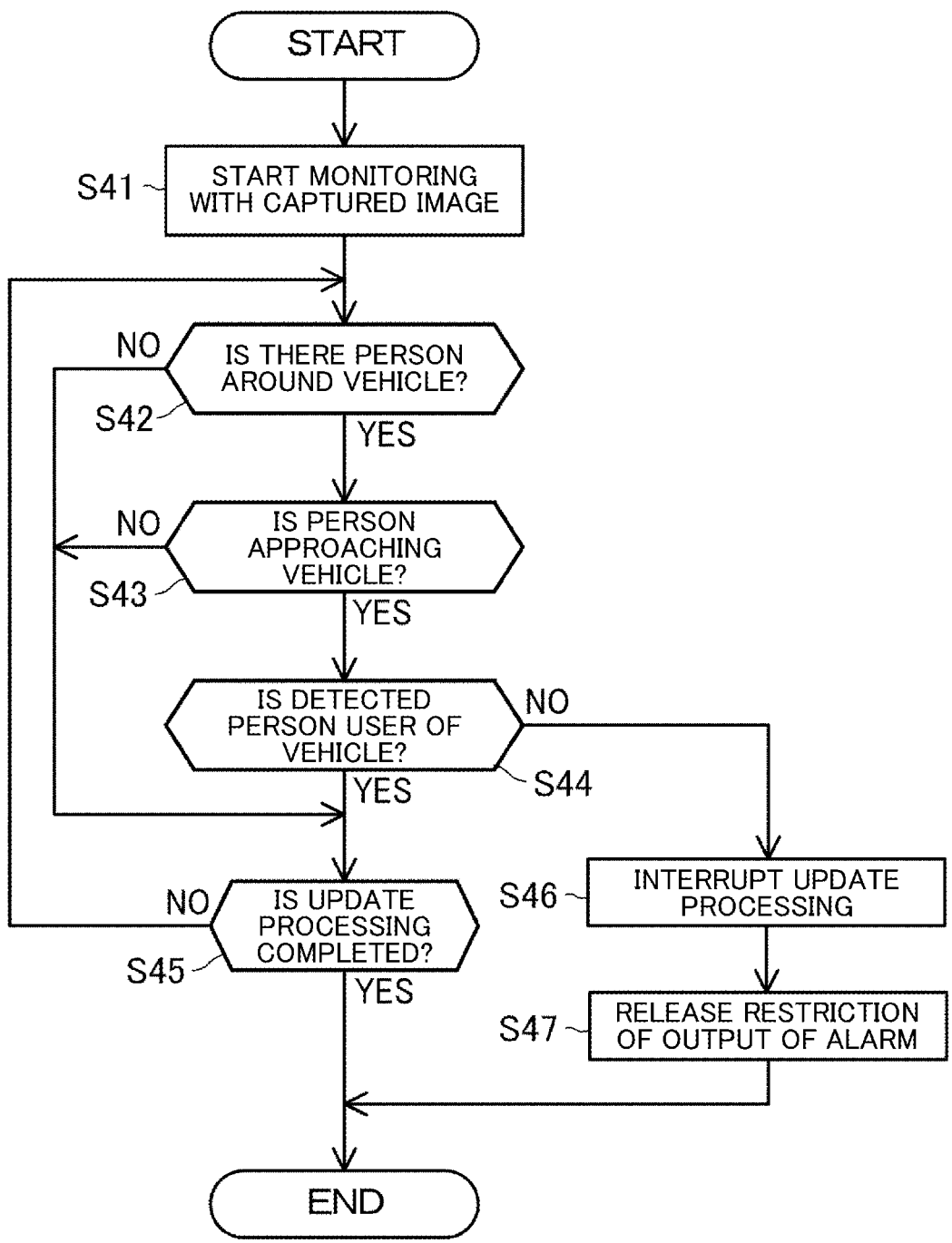
FIG. 5 is a flowchart showing an operation example of the control system.

FIG. 5 shows the installation monitoring processing. The installation monitoring processing is executed by the program management unit 111 or the alarm output control unit 122 in parallel with the update processing executed in step S22 in FIG. 3.

The control system 1 starts monitoring with the image captured by the camera 23 (step S41). The control system 1 acquires the image captured by the camera 23, and determines whether there is a person around the vehicle V (step S42). Step S42 is, for example, the same process as step S17.

When the control system 1 determines that there is no person around the vehicle V (NO in step S42), the process proceeds to step S45, which will be described below.

When determining that there is a person around the vehicle V (YES in step S42), the control system 1 determines whether the person detected from the captured image is approaching the vehicle V (step S43). Step S43 is, for example, the same process as step S18.

When the control system 1 determines that the person detected from the captured image is not approaching the vehicle V (NO in step S43), the process proceeds to step S45. When determining that the person detected from the captured image is approaching the vehicle V (YES in step S43), the control system 1 determines whether the person detected from the captured image is the user of the vehicle V (step S44). Step S44 is, for example, the same process as step S19.

When determining that the person detected from the captured image is not the user of the vehicle V (NO in step S44), the control system 1 interrupts the update processing being executed (step S46). Subsequently, the control system 1 causes the alarm output control unit 122 to release the restriction of the output of alarm (step S47), and this operation ends. The process of interrupting the update processing can be executed as a so-called interrupt process. When the update processing interrupted, the control system 1 may output an error and end the operation, and the process may proceed to step S16 in FIG. 3.

When the control system 1 determines that the person detected from the captured image is the user of the vehicle V (YES in step S44), the process proceeds to step S45. In step S45, the control system 1 determines whether the update processing is completed (step S45). When the control system 1 determines that the update processing is not completed (NO in step S45), the process returns to step S42. When the control system 1 determines whether the update processing is completed (YES in step S45), this processing ends.

Figure 6:
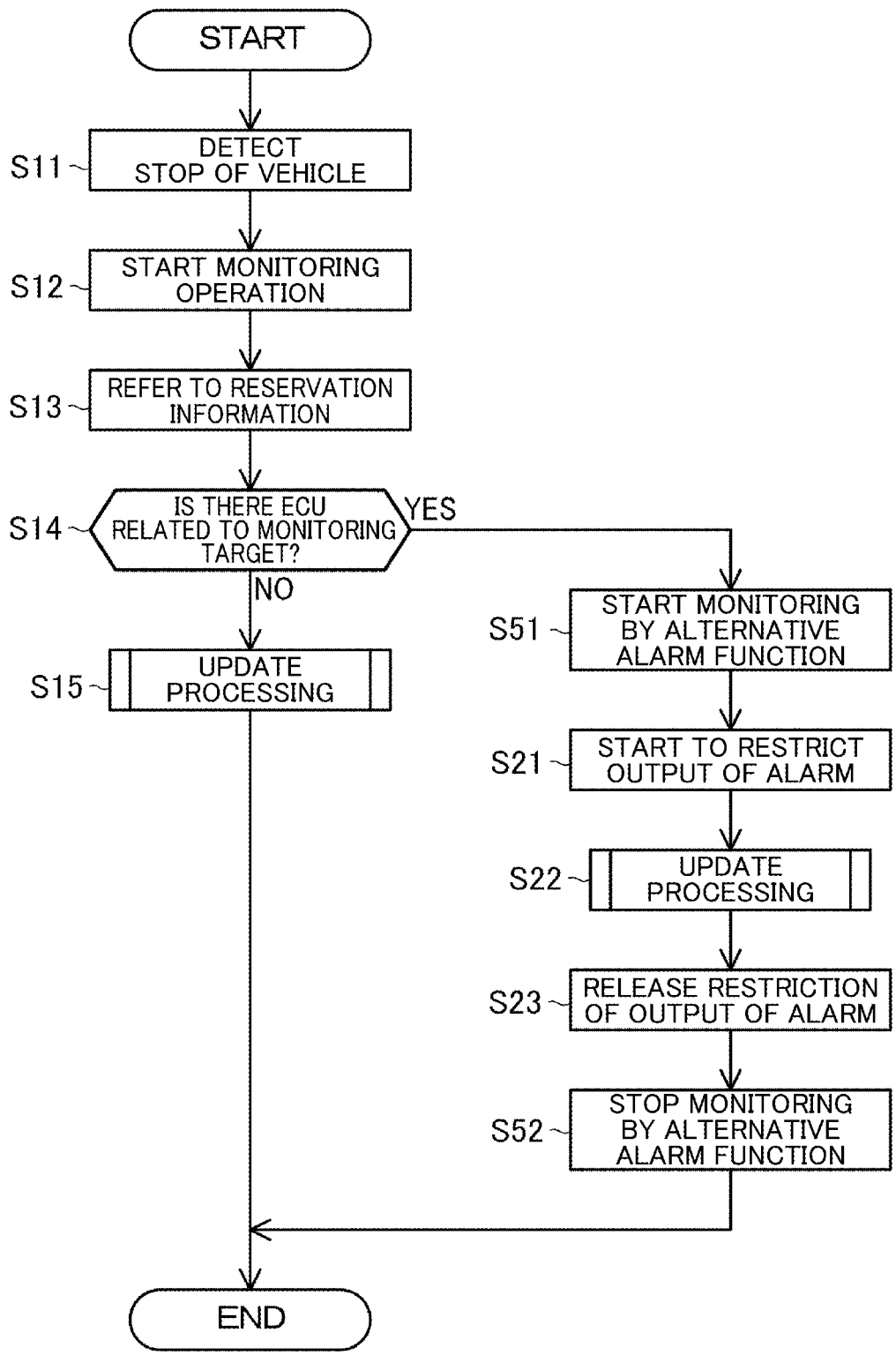
FIG. 6 is a flowchart showing an operation example of the control system.

FIG. 6 shows an operation example different from that in FIG. 3. Operations of steps S51 and S52 are executed instead of the monitoring with the image captured by the camera 23 executed in steps S16 to S19 in FIG. 3 and the installation monitoring processing in step S20. Steps S51 and S52 are executed by the program management unit 111 or the alarm output control unit 122. In FIG. 6, the same processes as those in FIG. 3 are denoted as the same step numbers, and will not be described.

When determining in step S14 that the ECU 10, in which the program is installed, is related to the monitoring target TG (YES in step S14), the control system 1 starts monitoring by an alternative alarm function (step S51). The alternative alarm function is to detect an abnormality in the vehicle V and to output an alarm instead of the alarm unit 121. For example, the alternative alarm function is to detect an abnormality with the ultrasonic sensor 141 of the alarm apparatus 14 and perform a notification with the buzzer 142. In the present embodiment, the control system 1 causes the alarm apparatus 14 to start monitoring in step S51. Thus, the vehicle V is monitored by the ultrasonic sensor 141.

Thereafter, the control system 1 executes steps S21 to S23, releases the restriction of the output of alarm from the alarm unit 121 in step S23, and then stops the monitoring started in step S51 (step S52).

As described above, the control system 1 can monitor the vehicle V with the monitoring function using the alarm unit 121, and can restrict the output of alarm when the program is installed in the ECU 10 related to the monitoring target TG of the monitoring function. When the program is installed in the ECU 10, restarting of the ECU 10, reloading of the control program, an interruption of detection using the sensors connected to the ECU 10, and an interruption of communication with other ECUs 10 occur. When these events occur, an abnormality may be detected by the monitoring function, resulting in erroneous output of the alarm, that is, erroneous notification. According to the control system 1 of the present embodiment, it is possible to prevent erroneous notification by the restriction of the output of alarm when the program is installed in the ECU 10.

In the operation in FIG. 3, before the restriction the output of alarm, the control system 1 makes a determination with the image captured by the camera 23, and determined whether there is a risk of the vehicle V being stolen or damaged. Then, when it is determined that there is a risk of the vehicle V being stolen or damaged, the restriction of the output of alarm is not started, and thus the security performance of the vehicle V can be maintained. Furthermore, the installation monitoring processing shown in FIG. 5 is executed while the output of alarm is restricted, whereby the security performance of the vehicle V can be maintained even when the program is being installed. In addition, when the vehicle V is equipped with a security function different from the alarm unit 121, it is also possible to perform monitoring using such a security function while the program is being installed. Therefore, it is possible to prevent erroneous output of an alarm at the time of the installation of the program while maintaining the security performance of the vehicle V.

In the operation example in FIG. 6, the example has been described in which the alarm apparatus 14 is used for the operation in FIG. 3, but the alarm apparatus 14 may be used for the installation monitoring processing in FIG. 5, for example. In other words, instead of steps S41 to S44 in FIG. 5, the ultrasonic sensor 141 may execute the alert operation. In this case, when the ultrasonic sensor 141 detects an abnormality, steps S46 and S47 may be executed to interrupt the installation by the program management unit 111.

The above-described embodiment shows a specific example to which the present invention is applied, and does not limit the form to which the present invention is applied.

The operations shown in FIGS. 3 to 6 described in the above embodiment can be applied when the program management unit 111 installs programs in the plurality of ECUs 10. Specifically, the operation in FIG. 3 or 6 can be executed on the plurality of ECUs 10 in parallel. In this case, the output of alarm from the alarm unit 121 to the monitoring target TG is restricted while the program is being installed in the third ECU 13. In contrast, the output of alarm from the alarm unit 121 is not restricted while the program is being installed in the second ECU 12. Here, when the program is installed in the second ECU 12 and the third ECU 13 in parallel, the alarm output control unit 122 can be configured to restrict the alarm output to the monitoring target TG connected to the third ECU 13 by the alarm unit 121, and not to restrict the output of alarm when wrongful acts are detected using other devices. In this example, the third ECU 13 corresponds to an example of a first electronic device, and the second ECU 12 corresponds to an example of a second electronic device.

In the above-described embodiment, an example has been described in which the first ECU 11 among the ECUs 10 constituting the control system 1 includes the program management unit 111 and the program is installed in the third ECU 13 by the program management unit 111. Such a configuration is an example, and the program management unit 111 may install the program in the first ECU 11 itself, or may install the program in another ECU 10. Further, a configuration may be provided in which the program can be installed in the alarm apparatus 14 or the lamp body ECU 24.

In the above-described embodiment, the description has been given with respect to the operation in the case where the installation of the program is reserved while the vehicle V is running and then the vehicle V is stopped, but opportunities to execute the operations shown in FIGS. 3 to 6 are not limited thereto. For example, the control system 1 may execute the operations shown in FIGS. 3 to 6 when an instruction to update the program is given by the operation of the user or by the server 2 while the vehicle V is stopped.

In the above-described embodiment, an example has been described in which the alarm apparatus 14 is used as the alternative alarm function, but the alternative alarm function provided in the control system 1 is not limited to the configuration of the alarm apparatus 14. For example, the control system 1 may include an alarm apparatus provided with a vibration sensor or an alarm apparatus using a sensor that detects contact with a vehicle body of the vehicle V.

In the above-described embodiment, an example has been described in which the monitoring targets TGs of the alarm unit 121 are the hood switch 31, the door switch 32, and the circon switch 33. This is merely an example, the monitoring target TG may be any of the ECU 10 and the device that are provided in the control system 1, and the type and number of monitoring targets TGs are not limited.

FIGS. 1 and 2 are schematic diagrams showing functional configuration of each apparatus of the management system 100 divided according to the main processing contents for easy understanding of the present invention, and are not limited to the configuration of the apparatus. Each of the processes shown in FIGS. 3 to 6 may be executed by one program or may be executed by a plurality of programs.

In addition, the vehicle V is, for example, a four-wheeled vehicle, but the type of the vehicle V is not particularly limited, and may be a large-sized vehicle, a commercial vehicle, a two-wheeled vehicle, or a three-wheeled vehicle, for example. Additionally, the configuration of each component in the control system 1 can be arbitrarily changed.

[Configurations Supported by Embodiment Described Above]

The above-described embodiment supports the following configurations.

(Configuration 1) A control apparatus including: an alarm unit that executes a monitoring function of detecting a wrongful act on a vehicle and causes an alarm output unit to output an alarm when the wrongful act is detected by the monitoring function; a software update unit that performs an update of software of an electronic device equipped in the vehicle; and an alarm output control unit that performs restriction of the output of the alarm when the software update unit performs the update of the software of the electronic device.

According to the control apparatus of Configuration 1, it is possible to prevent erroneous output of the alarm with the monitoring function of the vehicle, and to update the software of the electronic device equipped in the vehicle. Thus, it is possible to increase opportunities for improving the function of the vehicle through the update of the software, thereby contributing to the advancement of sustainable transport systems.

(Configuration 2) In the control apparatus according to Configuration 1, the software update unit updates the software of the electronic device after the restriction is started by the alarm output control unit.

According to the control apparatus of Configuration 2, it is possible to reliably prevent erroneous output of the alarm with the monitoring function.

(Configuration 3) In the control apparatus according to Configuration 1 or 2, the alarm output control unit releases the restriction of the output of the alarm after the update of the software of the electronic device by the software update unit is completed.

According to the control apparatus of Configuration 3, the monitoring function of the vehicle can be executed when there is no risk of the erroneous output of the alarm, and thus the vehicle can be protected more reliably.

(Configuration 4) In the control apparatus according to any one of Configurations 1 to 3, the alarm output control unit restricts a start of the monitoring function until the update of the software of the electronic device is completed when the update of the software of the electronic device by the software update unit is scheduled in a state in which the monitoring function of the alarm unit is not executed.

According to the control apparatus of Configuration 4, since the monitoring function is not started when the update of the software is scheduled, it is possible to prevent the erroneous output of the alarm due to the update of the software.

(Configuration 5) In the control apparatus according to any one of Configurations 1 to 4, the control apparatus further includes an image capturing unit that captures an image outside of the vehicle, and the alarm output control unit detects a person using the image captured by the image capturing unit when performing the restriction of the output of the alarm, and performs the restriction of the output of the alarm caused by the alarm unit when there is no person around the vehicle.

According to the control apparatus of Configuration 5, since the output of alarm is restricted after confirmation of the fact that a probability of wrongful acts on the vehicle is low using the captured image, the security performance of the vehicle can be maintained while the output of alarm is being restricted.

(Configuration 6) In the control apparatus according to Configuration 5, the alarm output control unit determines whether the person detected using the image captured by the image capturing unit is approaching the vehicle, and when the person is approaching the vehicle, causes the software update unit to stop the update of the software of the electronic device and releases the restriction of the output of the alarm.

According to the control apparatus of Configuration 6, it is possible to more reliably confirm, based on the captured image, the fact that a probability of wrongful acts on the vehicle is low.

(Configuration 7) In the control apparatus according to Configuration 5 or 6, the alarm output control unit determines whether the person detected using the image captured by the image capturing unit is an authorized user of the vehicle, and performs the restriction of the output of the alarm caused by the alarm unit when the person is the authorized user of the vehicle.

According to the control apparatus of Configuration 7, since the user of the vehicle can be excluded from a target for alert, it is possible to improve convenience while protecting the vehicle.

(Configuration 8) In the control apparatus according to any one of Configurations 1 to 7, when the wrongful act on the vehicle is detected after the update of the software of the electronic device by the software update unit is started, the alarm output control unit causes the software update unit to stop the update of the software of the electronic device and releases the restriction of the output of the alarm.

According to the control apparatus of Configuration 8, since the restriction of the output of alarm is released when the wrongful acts on the vehicle are detected while the software is being updated, the alarm can be output. Thus, the vehicle can be protected while the output of alarm is restricted and the software is updated.

(Configuration 9) In the control apparatus according to any one of Configurations 1 to 8, the electronic device includes a first electronic device and a second electronic device, and when the software update unit performs an update of software of the first electronic device, the alarm output control unit performs the restriction of the output of the alarm when the wrongful act is detected with respect to the first electronic device by the monitoring function, and does not perform the restriction of the output of the alarm when the wrongful act is detected with respect to the second electronic device by the monitoring function.

According to the control apparatus of Configuration 9, since the output of alarm is not restricted when the software is updated for the electronic device that does not affect the monitoring function from the update of the software, the security performance of the vehicle can be maintained.

(Configuration 10) In the control apparatus according to any one of Configurations 1 to 9, the alarm output unit includes a communication apparatus connected to a designated external apparatus via a communication line, and the alarm unit causes the communication apparatus to transmit information indicating the alarm to the external apparatus when the wrongful act is detected by the monitoring function.

According to the control apparatus of Configuration 10, information indicating the alarm can be transmitted to the external apparatus, as an operation of outputting the alarm. Thus, it is possible to inform a user or the like who is away from the vehicle of the wrongful acts on the vehicle.

(Configuration 11) A control method including: executing a monitoring function of detecting a wrongful act on a vehicle; causing an alarm output unit to output an alarm when the wrongful act is detected by the monitoring function; and performing restriction of the output of the alarm when a software update unit updates software of an electronic device equipped in the vehicle.

According to the control method of Configuration 11, it is possible to prevent erroneous output of the alarm with the monitoring function of the vehicle, and to update the software of the electronic device equipped in the vehicle. Thus, it is possible to increase opportunities for improving the function of the vehicle through the update of the software, thereby contributing to the advancement of sustainable transport systems.

REFERENCE SIGNS LIST 1 control system
2 server
3 mobile terminal (external apparatus)
10 ECU
11 first ECU
12 second ECU
13 third ECU
14 alarm apparatus
21 TCU
22 horn
23 camera (image capturing unit)
24 lamp body ECU
25 hazard lamp
31 hood switch
32 door switch
33 circon switch
41 communication line
42 communication line
100 management system
110 processor
111 program management unit (software update unit)
112 detection unit
115 memory
116 control program
117 device information
118 reservation information
120 processor
121 alarm unit
122 alarm output control unit
125 memory
126 control program
130 processor
131 program execution unit
135 memory
136 control program
137 application program
141 ultrasonic sensor
142 buzzer
N communication network
TG monitoring target
V vehicle.

What is claimed is:

1. A control apparatus comprising a processor, wherein the processor includes:
    an alarm unit that executes a monitoring function of detecting a wrongful act on a vehicle and causes an alarm output unit to output an alarm when the wrongful act is detected by the monitoring function;
    a software update unit that performs an update of software of an electronic device equipped in the vehicle; and
    an alarm output control unit that performs restriction of the output of the alarm when the software update unit performs the update of the software of the electronic device.

2. The control apparatus according to claim 1, wherein the software update unit updates the software of the electronic device after the restriction is started by the alarm output control unit.

3. The control apparatus according to claim 1, wherein the alarm output control unit releases the restriction of the output of the alarm after the update of the software of the electronic device by the software update unit is completed.

4. The control apparatus according to claim 1, wherein the alarm output control unit restricts a start of the monitoring function until the update of the software of the electronic device is completed when the update of the software of the electronic device by the software update unit is scheduled in a state in which the monitoring function of the alarm unit is not executed.

5. The control apparatus according to claim 1, wherein the processor further comprising
    an image capturing unit that captures an image outside of the vehicle, wherein
    the alarm output control unit detects a person using the image captured by the image capturing unit when performing the restriction of the output of the alarm, and performs the restriction of the output of the alarm caused by the alarm unit when there is no person around the vehicle.

6. The control apparatus according to claim 5, wherein the alarm output control unit determines whether the person detected using the image captured by the image capturing unit is approaching the vehicle, and when the person is approaching the vehicle, causes the software update unit to stop the update of the software of the electronic device and releases the restriction of the output of the alarm.

7. The control apparatus according to claim 5, wherein the alarm output control unit determines whether the person detected using the image captured by the image capturing unit is an authorized user of the vehicle, and performs the restriction of the output of the alarm caused by the alarm unit when the person is the authorized user of the vehicle.

8. The control apparatus according to claim 1, wherein when the wrongful act on the vehicle is detected after the update of the software of the electronic device by the software update unit is started, the alarm output control unit causes the software update unit to stop the update of the software of the electronic device and releases the restriction of the output of the alarm.

9. The control apparatus according to claim 1, wherein the electronic device includes a first electronic device and a second electronic device, and
    when the software update unit performs an update of software of the first electronic device, the alarm output control unit performs the restriction of the output of the alarm when the wrongful act is detected with respect to the first electronic device by the monitoring function, and does not perform the restriction of the output of the alarm when the wrongful act is detected with respect to the second electronic device by the monitoring function.

10. The control apparatus according to claim 1, wherein
the alarm output unit includes a communication apparatus connected to a designated external apparatus via a communication line, and the alarm unit causes the communication apparatus to transmit information indicating the alarm to the external apparatus when the wrongful act is detected by the monitoring function.

11. A control method comprising:

executing a monitoring function of detecting a wrongful act on a vehicle;

causing an alarm output unit to output an alarm when the wrongful act is detected by the monitoring function; and performing restriction of the output of the alarm when a software update unit updates software of an electronic device equipped in the vehicle.

* * * * *